United States Patent [19]

Port et al.

[11] Patent Number: 5,406,322
[45] Date of Patent: Apr. 11, 1995

[54] PACKET-SWITCHED RING NETWORK HAVING DIRECT ACCESS TO LOW AND HIGH BANDWIDTH MEMORIES

[75] Inventors: Adrian G. Port, Lansdale; Charles D. Spackman, Chester Springs, both of Pa.

[73] Assignee: The Whitaker Corporation, Wilmington, Del.

[21] Appl. No.: 995,673

[22] Filed: Dec. 21, 1992

Related U.S. Application Data

[63] Continuation-in-part of Ser. No. 853,551, Mar. 18, 1992, Pat. No. 5,243,596.

[51] Int. Cl.⁶ .............................................. H04N 7/15
[52] U.S. Cl. ........................................ 348/15; 370/62
[58] Field of Search ................... 370/94.1, 62; 348/15; H04N 7/14, 7/15

[56] References Cited

U.S. PATENT DOCUMENTS

| | | |
|---|---|---|
| 4,596,013 | 6/1986 | Tashiro et al. . |
| 4,710,917 | 12/1987 | Tompkins et al. ................ 348/15 X |
| 4,768,190 | 8/1988 | Giancarlo . |
| 4,907,086 | 3/1990 | Truong . |
| 4,949,280 | 8/1990 | Littlefield . |
| 5,010,325 | 4/1991 | Ziuchkovski . |
| 5,014,267 | 5/1991 | Tompkins et al. .................... 370/62 |

FOREIGN PATENT DOCUMENTS 1636388 11/1988 Australia .

OTHER PUBLICATIONS

R. L. Philips, "A Scientific Visualization Workbench", *IEEE Proc. on Supercomputing*, 1988, pp. 148-155.
B. L. Trus et al., "Digital Image Processing Electron Micrographs—the PIC System" *Ultramicroscopy*, vol. 6, No. 4, 1981, pp. 383-386.
C. Weiss, "Desk Top Video Conferencing—An Important Feature of Future Visual Communications", *IEEE Conf. on Communications—ICC '90*, 1990, pp. 134-139.

*Primary Examiner*—James J. Groody
*Assistant Examiner*—Cheryl Cohen

[57] ABSTRACT

A data communications network in which multiple host processors are linked in a network by respective network interface systems. The data communications network transmits packet data containing video information. The network interface system includes circuitry which enables it to direct video data values received from the network directly to a frame buffer or preprocessor to the frame buffer in the host processor. The circuitry determines the destination for each packet, frame buffer or main memory, based on an identifier contained in the packet header. Circuitry routes video data directly to a frame buffer memory area or preprocessor to the frame buffer memory area in the host. The network interface system also includes circuitry which enables it to receive video data directly from a camera memory area in a host processor for transmission on the network. Circuitry generates data packets directly from video data held in a camera memory area where the video data was generated by a camera in the host.

11 Claims, 12 Drawing Sheets

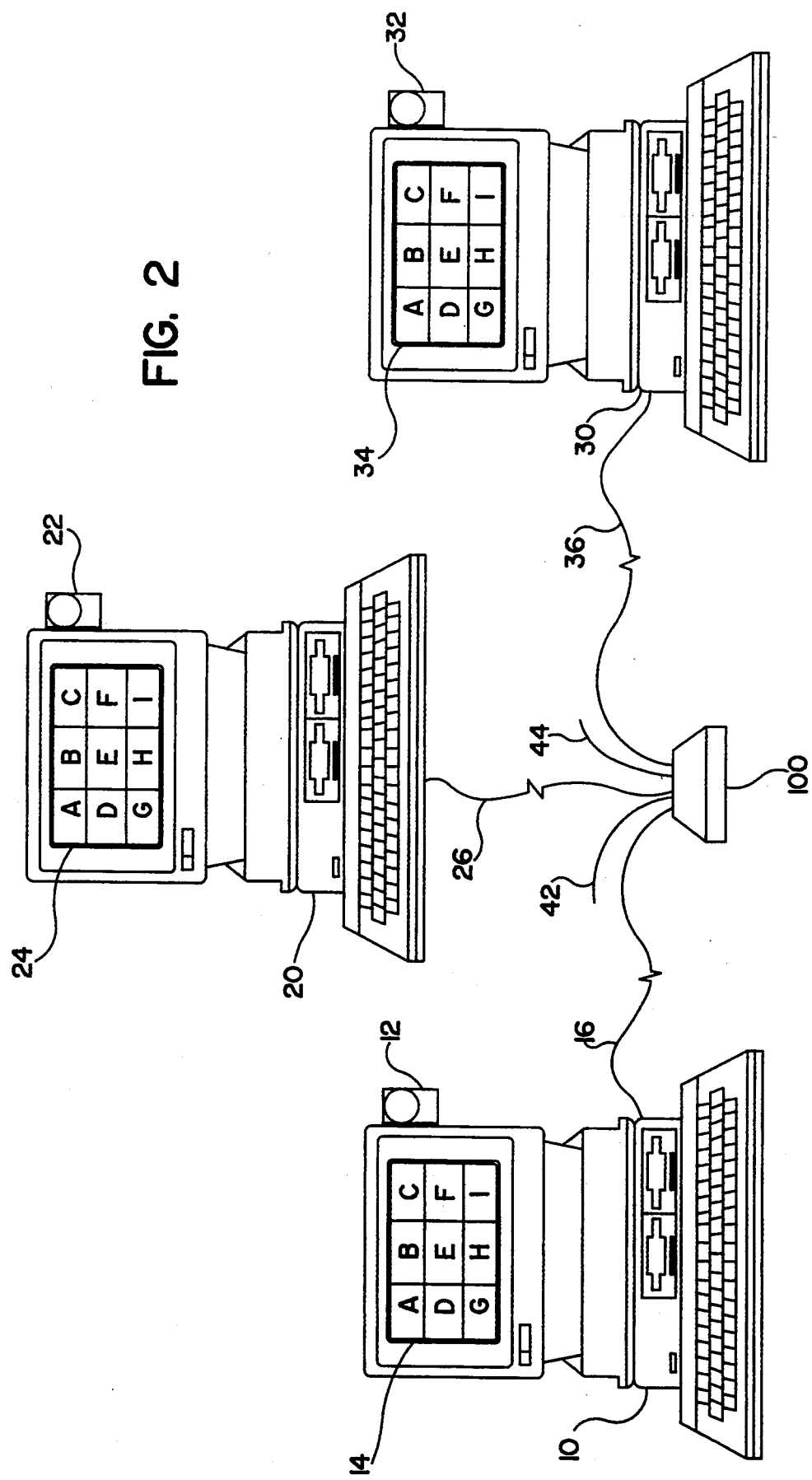

SHORT PACKET

NORMAL PACKET

PACKET-SWITCHED RING NETWORK HAVING DIRECT ACCESS TO LOW AND HIGH BANDWIDTH MEMORIES

BACKGROUND OF THE INVENTION

This application is a continuation in part of U.S. patent application Ser. No. 07/853,551 filed Mar. 18, 1992, now U.S. Pat. No. 5,243,596.

This invention concerns data communications networks in particular data communications networks that transmit real time video data between a plurality of devices connected to a network.

In data communication networks where real time video data is transmitted between a plurality of devices connected to a network, the devices are usually connected by one or more data paths. Networks are usually described by their topology (e.g. ring or star), by the set of protocols that control network resources, by the communications services that are provided to the host data processing systems and by the implemented applications.

In general, a network is judged by the maximum data rate it can support between two or more devices (host processors). A key factor affecting the performance of these communication networks is the level of involvement of the host processors. This, in turn, depends on how much of the protocol is implemented in hardware and how much is implemented in software. Viewed, for example, in terms of the Open Systems Interconnection (OSI) model, a typical network may be defined as having seven layers: physical, data link, network, transport, session, presentation and application.

FIG. 1, Prior Art, shows an example of how a currently available system may receive and transmit video data from a data communications network onto a display 160 and how it may receive video data from a camera 170 and transmit the received data onto a data communications network. In this example, the interface is a network interface processor 190 that receives packets addressed to the host from a network and then transmits the received data packets to the host memory 174 over a communications channel 150. The network interface 190 transmits received data packets from the network to the host memory 174 regardless of the type of data that the packet contains, i.e., whether the data is digitized video, voice, or parameter data.

The host processor 180, at the application level, evaluates the packet data in the host memory 174 and then processes it accordingly. If the data is video data to be displayed on the monitor 160, the host processor 180 notifies the frame assembler 162 that data is available in host memory 174. The frame assembler 162 then formats all or a portion of the image represented by the video data and transmits the formatted data to a specific memory area in the frame buffer 164 representing a portion of the image area of the monitor 160.

The frame buffer 164 is a memory storage device which receives formatted data and stores the data in a selected memory area. The device driver 166 retrieves the formatted data stored in the frame buffer and displays the data on the monitor 160.

During this process, the host memory 174 may receive requests from other devices from within the host to store data into or retrieve data from its memory area. As a result, the host memory 174 is not always immediately able to receive video data from the network interface 190 or to transmit video data to the frame assembler 162. This limits either the frame or field repetition rate or the size of the image that can be processed and displayed on a real time basis.

Similarly, the camera 170 generates a video signal having a certain frame or field rate and image size which is converted to packet data and transmitted onto the network. In this system, the camera 170 generates a video signal representing light reflected from a scene and transmits the video signal to the camera interface 172. The camera interface 172 converts the signal to digital video data and transmits video data to the host memory 174. The host processor 180 transmits the data in packet form from the host memory 174 over the communications channel 150 to the network interface 190. The network interface 190 then transmits the packets onto the network.

As noted above, the host processor 180, processes requests from other devices, including the frame assembler 162 and network interface 190 (for incoming video signals) while processing the video data generated by the camera interface 172. Much of this data is at least temporarily stored into and retrieved from the host memory 174. The limited bandwidth for transferring the data to and from the host memory 174 limits either the frame refresh rate or the size of the image that can be generated and processed by the host.

One way, known in the art, to increase the system throughput is to dedicate networks and processors strictly for the video data. This method is described in a paper entitled "DESK TOP VIDEO CONFERENCING-AN IMPORTANT FEATURE OF FUTURE VISUAL COMMUNICATIONS" by Christoph Weiss, IEEE 1990, pages 212.1.1 to 212.1.6 and a paper entitled "A Scientific Visualization Workbench" by Richard L. Phillips, IEEE 1988, pages 148 to 155. The networks described in these papers, however, dedicate an entire network structure to support the transmission of video data. These networks do not also support the transmission of digital data information.

The network described by Weiss only transmits video data to each computer system which is connected to a central processor. Each computer system in the network transmits video data to a central processor. The central processor generates a single video image from the video signals sent from each computer system. The video data representing the single video image is transmitted to each computer system and displayed on its monitor.

The network described by Phillips uses a separate network to transmit video information from a central processor to individual workstations where the video information is received from various devices attached to the central processor. There is a central processor which transmits video information to each workstation attached to a video data transmission network. Devices attached to the central processor provide the source of video information along with video data stored in memory devices.

Although the systems described above concern the handling of video data in a manner different from other types of data, the same types of problems may occur in systems which must simultaneously handle both high-bandwidth data and other lower bandwidth data.

SUMMARY OF THE INVENTION

The present invention is embodied in a network interface system suitable for use in coupling a host processor to a data communications network which conveys data to and from both high-bandwidth sources and other, lower bandwidth sources. In this network, the host processor has a data memory area to store the lower bandwidth data values and a distinct memory buffer area to store the higher-bandwidth data. The data transmitted on the network has a destination address and other information which indicates whether the data is high-bandwidth data.

The network interface system receives data from the network and holds it in a memory if the destination address of the data indicates that it is to be received by the network interface system.

The network interface system, responsive to the other information, transfers the data from the network interface memory directly to the high-bandwidth data memory buffer area if the other information indicates the held data is high-bandwidth data, and transfers the data from the network interface memory to the data memory area if the other information indicates the held data is not high-bandwidth data.

According to another aspect of the invention, the host processor is coupled to a camera capable of generating video signals as the high-bandwidth data, a data memory area used to store data values and a camera memory area used to store video data, and the data transferred through the network have a destination address and other information which indicates whether the data being transferred is video data.

The network interface system transfers the destination address and other information from the host processor and transfers the video data directly from the camera memory area. The interface system forms packets containing the video data transferred from the camera memory area, the destination address and a socket identifier which directs the data directly to a video buffer at the destination node. The interface system then places the formed packets onto the network.

According to another aspect of the invention, the host processor converts the video signals generated by the camera to video data and places the video data in the camera memory area.

The network interface system forms packets containing the video data transferred from the camera memory area, and the destination address and the video socket identifier which are transferred from the host processor and places the formed packets onto the network.

According to yet another aspect of the invention, the network interface system includes dedicated digital logic which is designed to access data in both the main memory and the high-bandwidth memory buffer, to packet and depacket the accessed data and to transmit and receive data from the network with minimal intervention from the host processor.

According to another aspect of the invention, the network interface system includes facilities for automatically handling multicasted data for both the high-bandwidth and lower bandwidth data.

BRIEF DESCRIPTION OF THE DRAWINGS

FIG. 2 is a perspective drawing of an computer network which may include an embodiment of the invention.

FIG. 3b is a block diagram of an alternative exemplary host and interface configuration of the host and interface configuration shown in FIG. 3a.

DETAILED DESCRIPTION OF THE INVENTION

Overview

Figure 1:
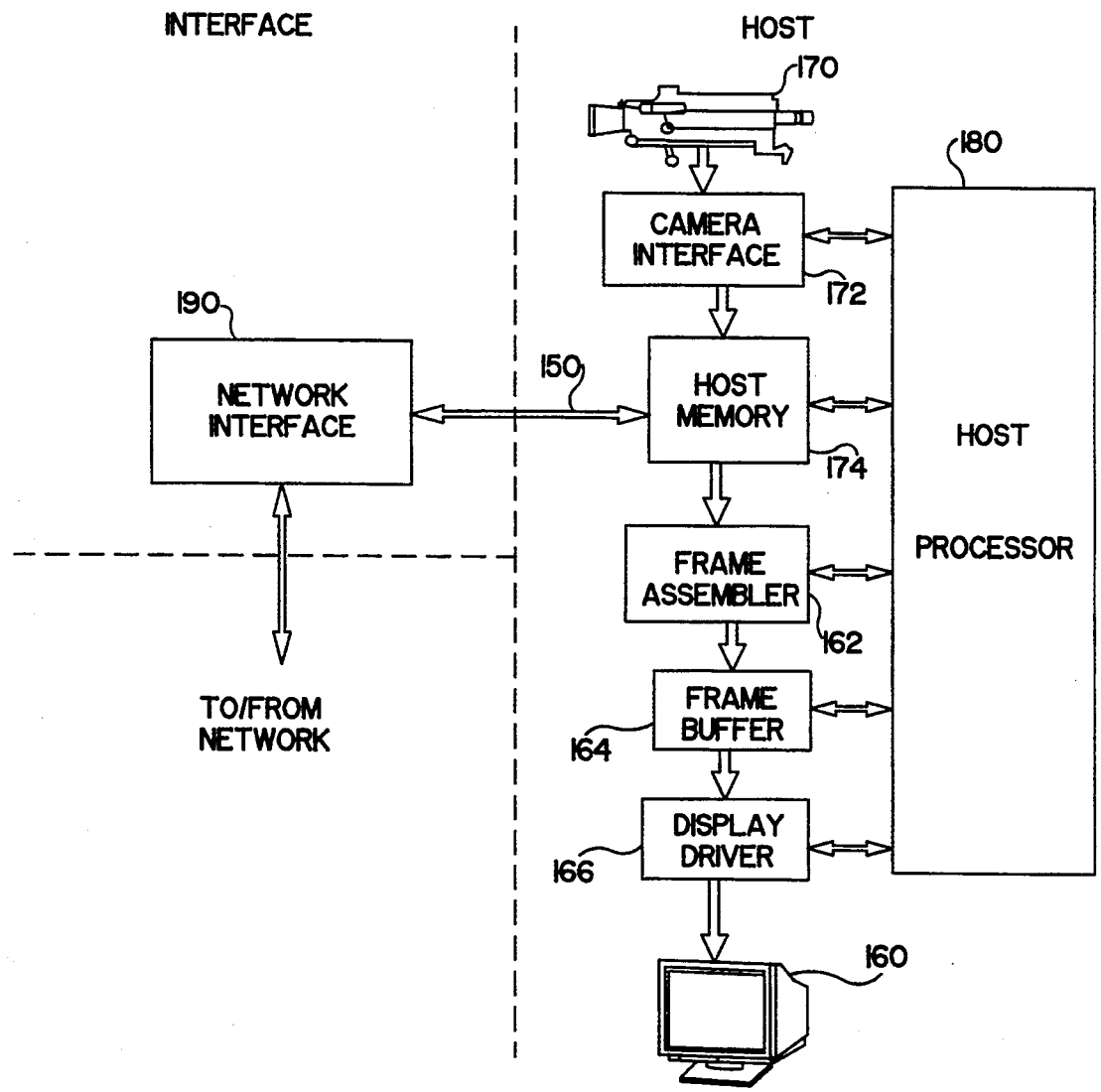
FIG. 1 (prior art) is a block diagram of an exemplary data communications network capable of sending and receiving data representing video signals.

In the material that follows, a network architecture is described which is suitable for transmitting data which requires a high-bandwidth data link concurrently with data that needs only a lower bandwidth link. While the invention has general application, for convenience the high-bandwidth data is described as video data. It is contemplated that other types of data, such as records from a database, which are best transmitted through a high-bandwidth channel also be accommodated by a system of this type.

FIG. 2 illustrates a computer network which may include an embodiment of the invention. In this network, each computer system 10, 20, and 30 is connected to a network 100. The network 100 could be a star or ring configuration. Each computer system includes a display area 14, 24, and 34 and a camera 12, 22, and 32, respectively. The cameras 12, 22, and 32 could be used for such purposes as to capture the image of the person or persons before the computer system or to capture the image of a sheet of paper.

Each display area 14, 24, and 34 may display video data from any computer or other video source connected to the network. In this example there are three computer systems 10, 20 and 30 shown. A plurality of other computer systems or dedicated video sources could be connected to the network as well as illustrated by communication lines 42 and 44.

In the example, the display area is segmented into nine areas denoted as A to I. Each segment may contain video data from any one computer system connected to the network or through the network. For example, area A could contain the video data that was generated from an image captured by camera 22 in the computer system 20.

Figure 5:
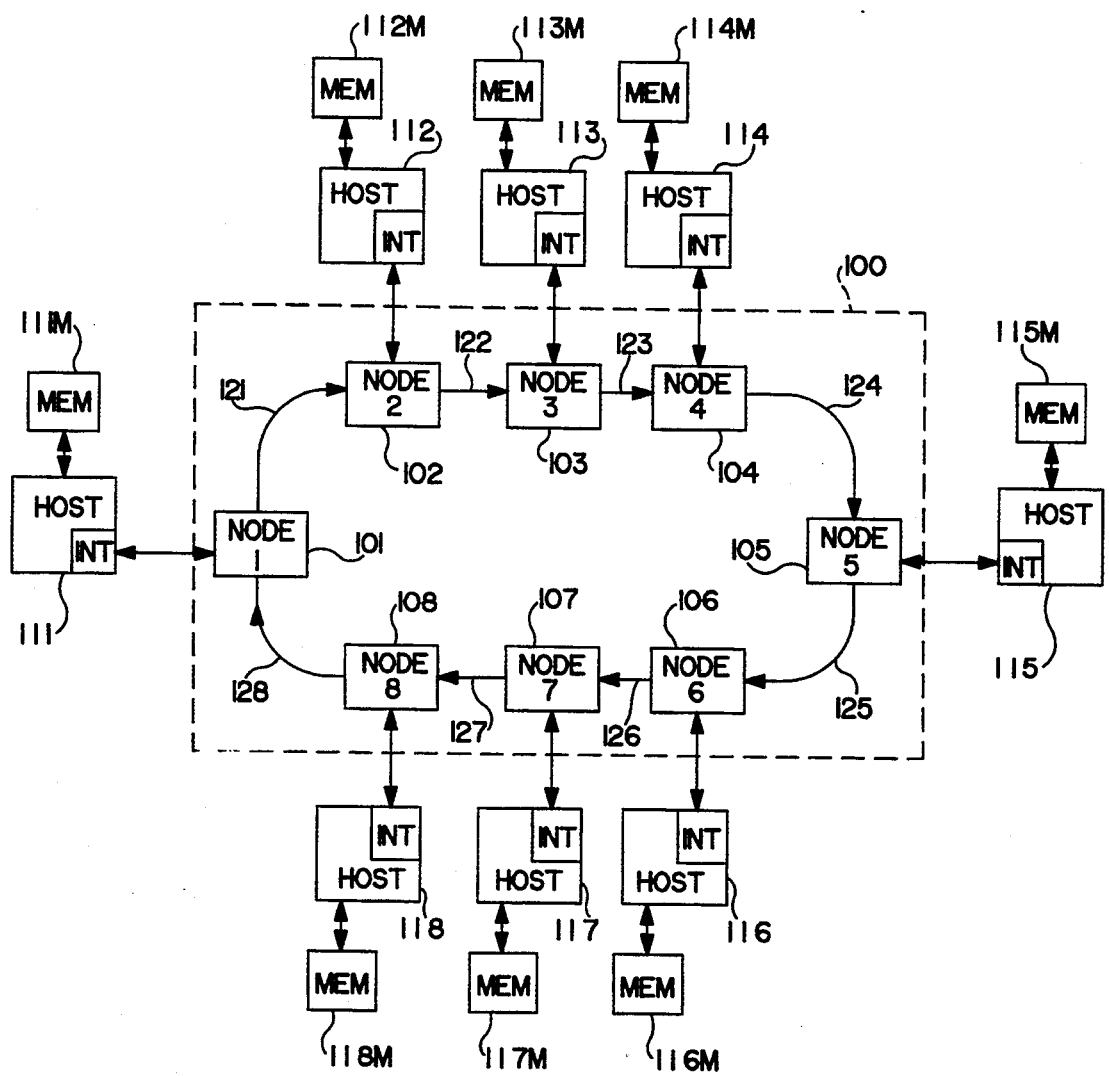
FIG. 5 is a block diagram of an exemplary data communications network suitable for use as the network shown in FIG. 2.

In addition to routing packets containing video data, network 100 may route data of any type that is transmitted by a computer system. FIG. 5 contains a block diagram of an exemplary embodiment of the data communications network 100. As shown in FIG. 5, network 100 includes nodes, 101 to 108, connected in series to form a circle or ring. Each node is connected to a host, e.g. 101 to 111, through a respective host interface processor denoted as INT. In addition each host has a host memory denoted as MEM. In relation to the computer network shown in FIG. 2, each computer system would include a host, a host interface processor, and host memory as illustrated in FIG. 5. A separate dedicated video source (not shown) may include only a host interface processor, distinct transmit and receive video buffers, a video camera and a video display device.

Figure 6:
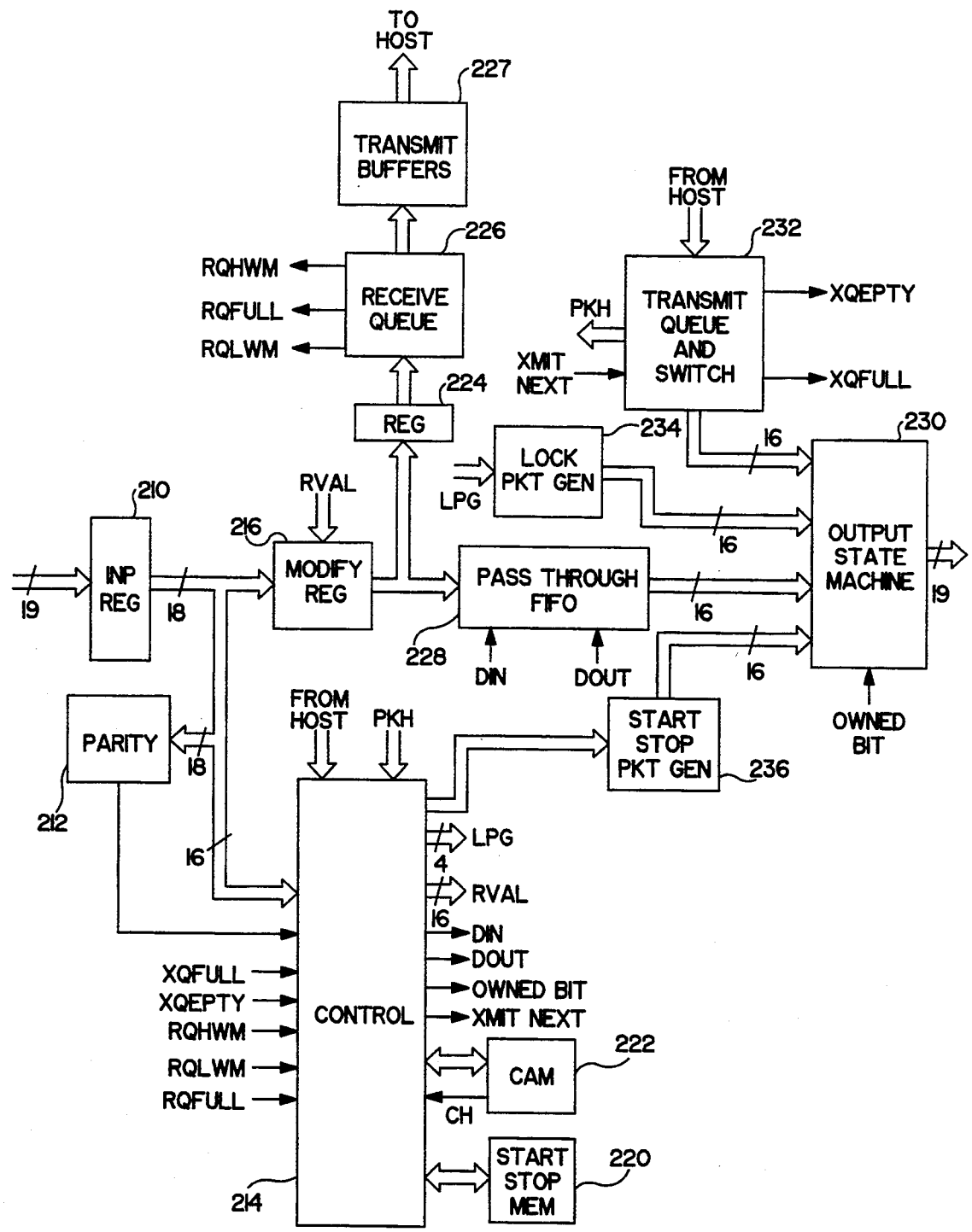
FIG. 6 is a block diagram of circuitry suitable for use as one of the nodes in the data communications network shown in FIG. 5.

FIG. 6 shows a block diagram of circuitry suitable for use as one of the nodes in the data communications network 100. As individual words of a data packet are received into the node they are stored in an input register 210. The control processor 214 evaluates the control information contained in a header area of each data packet to determine whether the node is to receive the data packet. The control information includes a socket identifier, a destination address and data type. Packets which the node is to receive (determined from the destination address or socket identifier) are passed through to the receive queue 226. A data packet is held in the receive queue 226 until the transmit buffer 227 is able to receive the packet. That is to say, pass the packet on to its attached host processor.

If the control information (destination address or socket identifier) contained in a data packet indicates that the packet is not destined for this node, it is passed to the pass through buffer 228 and then to the output state machine 230 where the data packet may be forwarded to the next node in the data communications network 100.

Data packets received from the host to be transmitted onto the network 100 are received and stored by the transmit queue and switch 232. The transmit queue and switch 232 transmit data packets received from the host to the output state machine 230. The output state machine 230 receives the data packets from the transmit queue and switch 232 and forwards the packets to the next node in the data communications network 100.

Figure 3A:
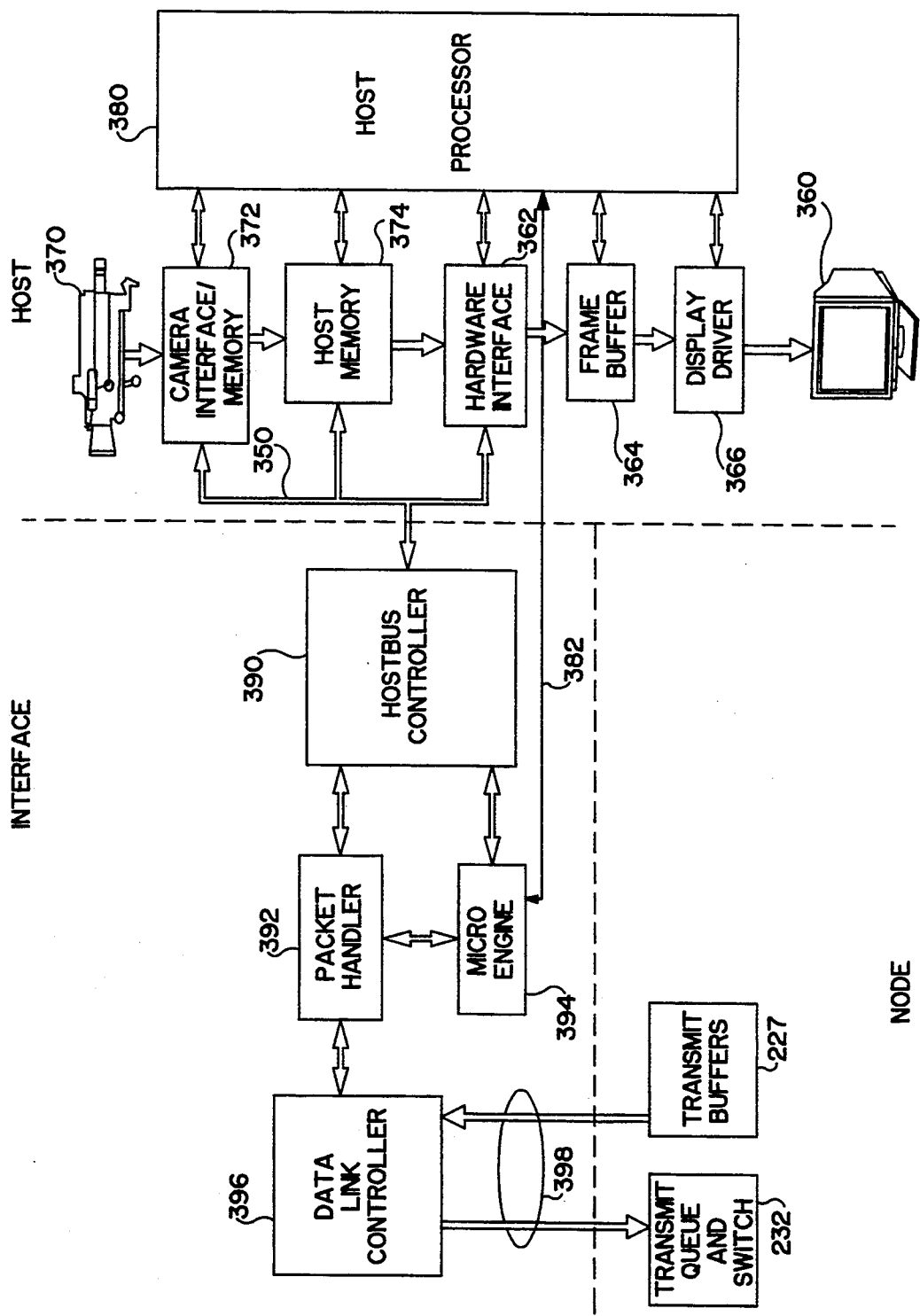
FIG. 3a is a block diagram of an exemplary host and interface configuration of the network shown in FIG. 2 which includes an embodiment of the invention.

FIG. 3a is a block diagram of an exemplary host and host interface configuration which receives data packets from the transmit buffers 227 of one of the nodes 102 through 108, and sends data packets back to the node, to the transmit queue and switch 232, as shown in FIG. 6. In this configuration the data link controller 396 is the link between the host interface processor and the node. The data link controller 396, in turn, receives data packets from and transmits data packets to the packet handler 392 of the host interface processor.

The packet handler 392 performs the task of packeting and depacketing data packets. The packet handler 392 creates data packets from data values and control information passed from the hostbus controller 390 and micro engine 394. The control information includes the destination address and socket identifier to be used to transmit the data.

The packet handler 392 also depackets data that it receives from the data link controller 396. The packet handler 392 transmits the data values contained in the data packet to the hostbus controller 390 and control information contained in the data packet to the micro engine 394 and hostbus controller 390.

The micro engine 394 receives control information from the host processor 380, the hostbus controller 390, and packet handler 392. The micro engine 394 uses the information to control part of the operation of the packet handler 392 and hostbus controller 390. The micro engine 394 also generates and sends header information to the packet handler 392 from the control information received from the host processor 380.

The hostbus controller 390 sends data values to and receives data values from both the packet handler 392 and host via the databus 350. The hostbus controller 390 receives data values and control information via packets passed to the node from the packet handler 392. The hostbus controller 390 also sends data values to the packet handler 392 to be formatted into packets and transmitted on the network 100 shown in FIG. 5.

The hostbus controller 390, via the databus 350, also sends data values to and retrieves data values from the host memory 374 and from the camera interface/memory 372. In addition, the controller 390 sends data values to the frame buffer 364 through a hardware interface 362. Alternatively, there may also be a separate bus (not shown) between the hostbus controller 390 and each device attached to the databus 350 and to the frame buffer 364. When the hostbus controller 390 receives data values and control information from the packet handler 392 it selects, based on the control information (e.g. the socket identifier) in the packet header of the received packet, which device, host memory 374, camera interface memory 372 hardware interface 362, or frame buffer 364 should receive the data values.

In the exemplary embodiment of the invention, the control information which directs the data in the packet to its destination is the socket identifier. Alternatively, it is contemplated that the packet header may include a value, V, which is used by the hostbus controller 390 to distinguish video data from lower bandwidth data. In the exemplary embodiment of the invention, if the socket identifier indicates that the packet data values are directed to or from one of the video data memory areas, the hostbus controller 390 selects either the camera memory 372 or the hardware interface 362 as the source/destination for the data. Otherwise, the hostbus controller 390 selects the host memory (data memory) 374 as the device on the databus 350 to receive the data values.

Since, in the exemplary embodiment of the invention, it is the socket identifier which specifies whether the data is high-bandwidth data or low-bandwidth data, the path to the appropriate memory is defined when the connection is first established for the socket. As described below, multicasting is handled based on socket identifiers. Accordingly, the interface processor automatically handles both direct connection and multicast high-bandwidth channels.

Figure 3B:
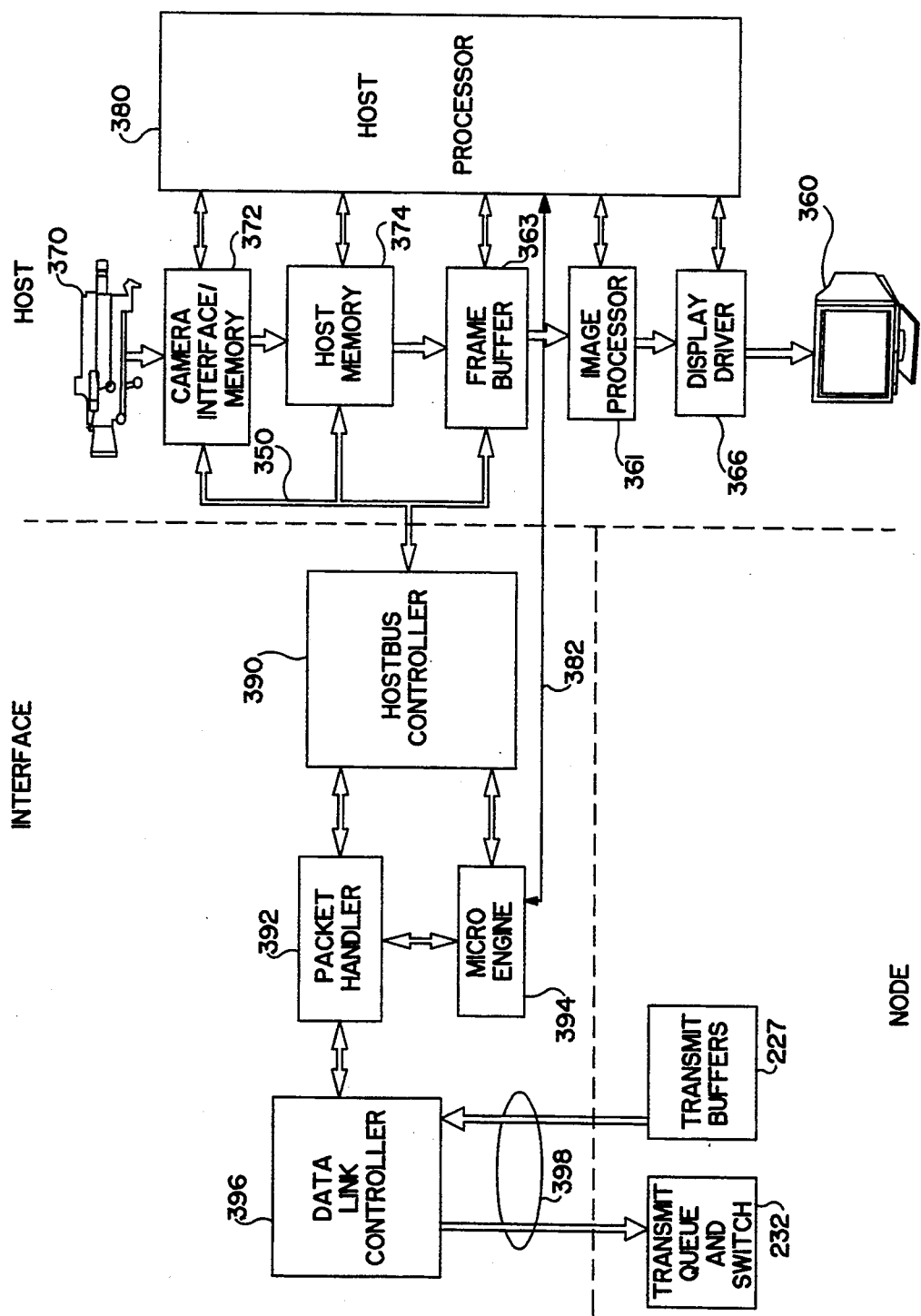

FIG. 3b is a block diagram of another exemplary host and interface configuration similar to the configuration shown in FIG. 3a. However, in this configuration, the hostbus controller 390 transmits video data values directly into a frame buffer 363. The frame buffer memory area 363 may contain several frame buffer storage areas so that multiple frame size images may be stored. The image processor 361 may form a single frame image from portions of the frame images stored in the frame buffer memory area 363.

Figure 4:
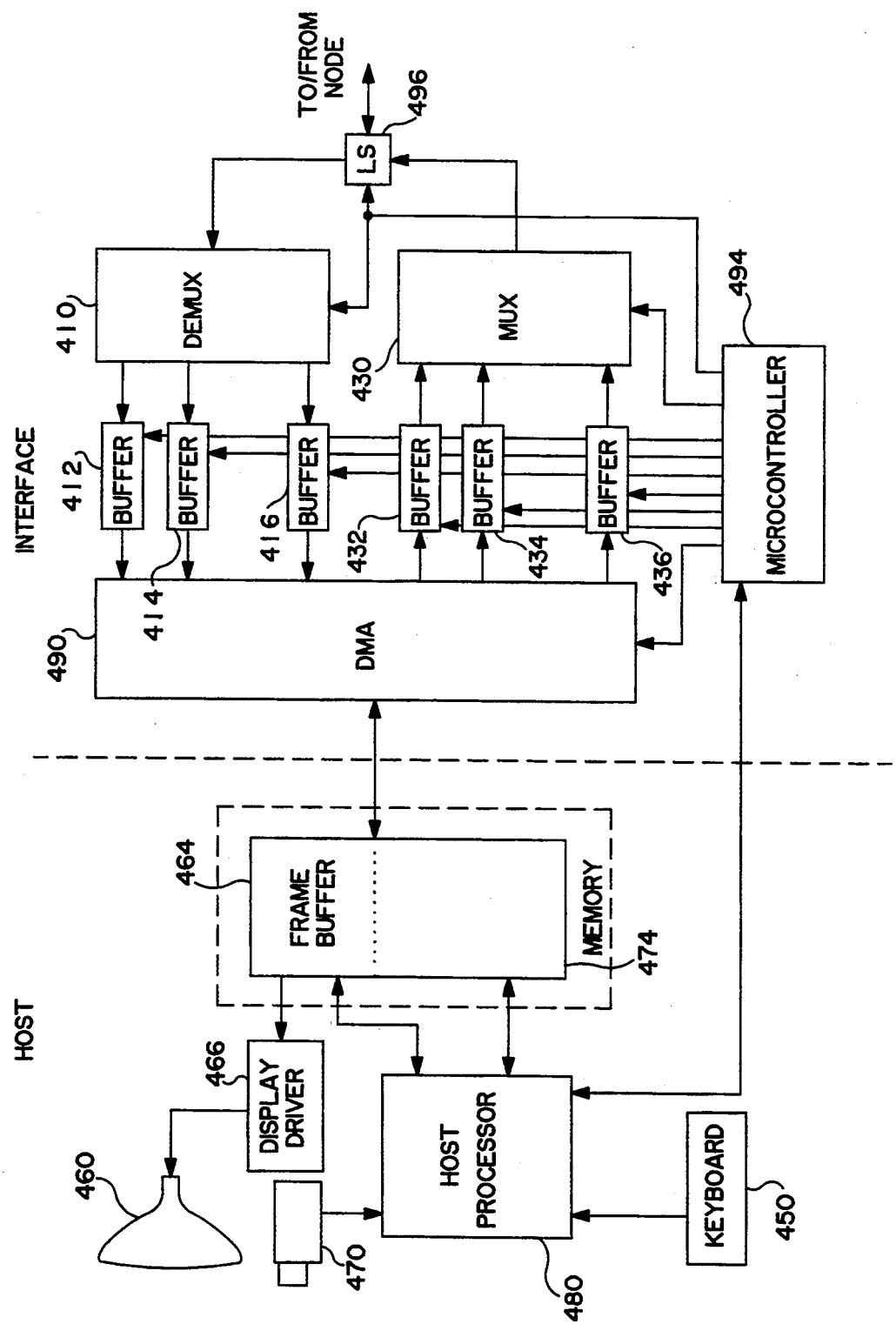
FIG. 4 is a block diagram of an alternative exemplary host and interface configuration of the network shown in FIG. 2.

FIG. 4 is also a block diagram of another exemplary host and interface configuration which is described in detail below.

Detailed Description of the Exemplary Embodiments

As stated above, FIG. 2 illustrates a computer network which may include an embodiment of the present invention. In this network, each computer system 10, 20, and 30 is connected to a network 100 where the network 100 is illustrated in FIG. 5. Each computer system includes a display area 14, 24, and 34 and a camera 12, 22, and 32, respectively. Alternatively, it is contemplated that a dedicated video connection (not shown) containing only a camera, display, buffer memory areas and a host interface processor may be connected to a node on the network.

The cameras 12, 22, and 32 are used to capture the image of the person or persons using the computer systems or to capture the image of a sheet of paper placed in its field of view. In this exemplary embodiment, to capture the image of a sheet of paper, the camera may, for example, be rotated to point vertically downward to an area beside the computer system. The cameras 12, 22, and 32 produce sampled data values representing the image in its field of view using an orthogonal sampling structure and transmit the data values in raster scan order.

The display areas 14, 24, and 34 display video data from any computer connected to the network. The display areas are the screen area of a color video monitor with a predefined pixel area and refresh rate. The pixel area is segmented into nine different regions denoted as A to I where one region may be used to display data from a process executing on the computer system. Eight of the nine areas contain video information from a computer system where the video information is stored in the frame buffer memory area in each computer system.

In the network 100 shown in FIG. 5, multiple host processors 111–118, having associated memories 111M–118M, are coupled to the ring network via respective host interface circuits INT which communicate directly with respective network interface processors, or nodes, 101–108, respectively. Each node in the network is connected to the next sequential node via a 19-bit unidirectional data communications path. Node 101 is connected to node 102 via the path 121, nodes 102 and 103 are connected via the path 122, and so on until the path 128 from node 108 to node 101 completes the ring.

In normal operation, a process being executed on one host processor, for example 111, may transfer a block of video data to be displayed to a frame buffer on a different host processor, say 114. To effect this transfer, the host 111 may send a message to its interface circuit, INT, identifying the block of data, the node to which the other processor is connected, and the identity of the process (i.e. socket identifier) which is to receive the data. The interface circuit takes 16-bit data words from the block, 16 words at a time, formats them into a packet, such as is shown in FIG. 8b, and sends the packet to the node 101.

It is contemplated that the host processor may issue a request each time that a frame or field is to be sent or, alternatively, may specify in a single request that data be continually sent at a rate intended to produce a desired frame repetition rate at the receiver.

In the packet produced by the packet handler 392, a 16-bit socket identifier (SOCKET ID) identifies the destination process and a buffer (e.g. one of the video buffer memories) designated by that process to receive the data, an eight-bit destination loop address (DEST LA) identifies the node 104 which is to receive the packet and an eight-bit source loop address (SOURCE LA) identifies the node 101 from which the packet is sent. A ten-bit packet type field (TYPE) may identifies the packet as a control packet or one which contains data. Also included in the third word are four one-bit flags, deletable (D), round-trip (R) and owned (O). An optional one-bit flag (V), shown in phantom, may be used as an alternative to using the SOCKET ID field to direct the packet to one of the video memories. The function of these flag bits is described below in greater detail.

Finally, a 16-bit field (OFFSET) is interpreted to identify an offset into the designated buffer area into which the sixteen 16-bit data words in the packet are to be written.

As described below, node 101 places the formatted packet onto the ring where it passes, via the data paths 121, 122 and 123 through the nodes 102 and 103 until it reaches the destination node 104.

When the packet is received at node 104, it is transferred to the host interface processor INT which couples host processor 114 to the network. This circuitry generates a destination address in the memory 114M or frame buffer memory area 364 or 464 for the 16 data words in the packet. The memory area into which the data is to be written is generated from the information in the SOCKET ID field and the address in that memory is generated from a combination of the SOCKET ID and OFFSET fields. The interface circuitry then transfers the sixteen words of data from the packet to the addressed locations in the memory 114M or frame buffer memory area 364, 363, or 464 shown in FIGS. 3a, 3b, and 4.

Figure 8A:
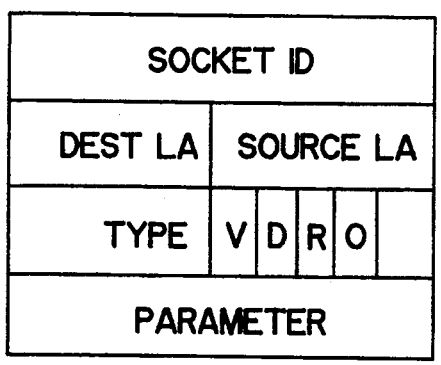
FIGS. 8a and 8b are data structure diagrams which illustrate exemplary packets suitable for use with the network shown in FIGS. 2-7.
Figure 8B:
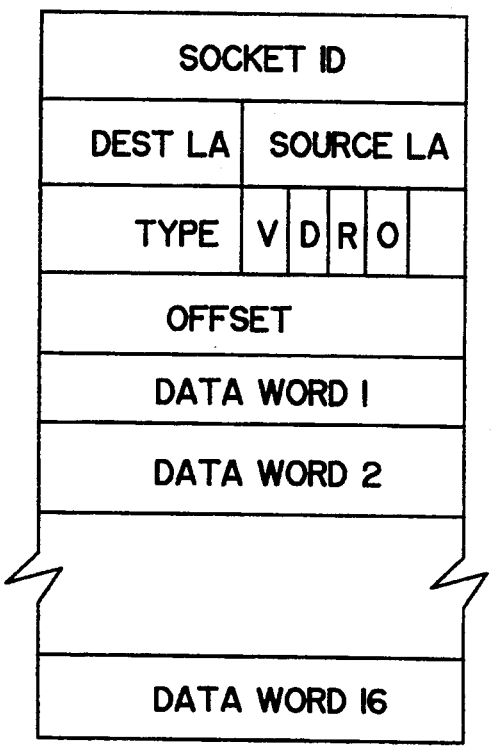

As shown in FIG. 8a, a short packet comprising only four words may also be transmitted between hosts or between nodes. Short packets are sent, as described below, to control the volume of data being sent to any one node, and to facilitate multicasting. A short packet may originate from a host or from a node, depending on how it is to be used.

FIG. 6 is a block diagram which shows details of the structure of one of the switch nodes 101 through 108. In the circuitry shown in FIG. 6, a 19-bit bus connects the output port of the previous node on the loop (not shown) to the input register 210. Of these 19 bits, 16 are data, two are parity and one, FIRST IN (shown in FIG. 7) is a pulse signal which indicates that the first word of a packet is being applied to the register 210.

Responsive to the FIRST IN signal, the input register 210 loads the 18-bit first word of the packet and applies it to the parity checking circuitry 212. The 16 bits of data from this first word are simultaneously applied to control circuitry 214 and to a modify register 216. After this first word of the packet has been processed, the remainder of the data values in the packet are loaded in sequence into the input register 210. These words are loaded in response to a clock signal (not shown) which is distributed to all of the nodes.

The parity checking circuitry 212 calculates the parity of the 16 data bits and compares it to the two received parity bits. If differences are found, a parity error is indicated to the control circuitry 214.

The control circuitry 214 is a finite state machine, or more properly, a group of interconnected finite state machines, which control the remainder of the node circuitry in response to the first four words of the packet, to commands and data provided by the host processor and to various internally generated signals. The functions performed by the control circuitry are described below with reference to FIGS. 9a through 10.

To perform these functions, the control circuitry 214 is coupled to a start/stop memory 220 and to a content addressable memory (CAM) 222. The control circuitry 214 also includes various state variables, such as OWNERSHIP and STOPPED, which are used as described below. These state variables may be one-bit boolean values which are accessible to one or more of the individual state machines that constitute the control circuitry 214.

The modify register 216 is responsive to a 16-bit value, RVAL, provided by the control circuitry 214 to selectively change individual bits of the 16-bit data values provided by the input register 210. Using this register, the control circuitry 214 can change individual bits in packet header words while the packets are being transferred through the node. The function of the modify register 216 is described below in greater detail with reference to FIG. 7.

Data values provided by the modify register 216 are applied to a register 224 which holds the data value while the control circuitry 214 determines if the packet is to be placed into the receive queue 226 and transferred to the host processor. In this embodiment of the invention, the control circuitry 214 examines the first three words of the packet to make this determination. While these words are being examined by the control circuitry 214, they are provisionally stored in available space in the receive queue 226. If it is later determined that the packet should not be received, these words in the receive queue 226 are invalidated and made available. If it is determined that this packet is to be received, the control circuitry 214 continues to store the words in the receive queue 226, in sequence, from the register 224.

In this embodiment of the invention, the receive queue 226 contains sufficient storage space for 25 packets. When all 25 packet positions are occupied, the queue 226 sends a signal RQFULL to the control circuitry 214. As set forth below, this signal conditions the control circuitry to stop sending data to the receive queue.

The receive queue is organized as a first-in first-out (FIFO) memory where each packet position may be considered a separate cell of the memory. As multiple packets are received they are shifted into respective packet positions. When a given packet position is filled, the packet is transferred to a transmit buffer 227. The buffer 227 includes 15 packet buffers, each of which may correspond to a respectively different logical channel of the host processor. In the exemplary embodiment of the invention, these logical channels are time-division multiplexed onto the signal transmitted from the node to the host via a twisted pair, coaxial cable, fiber optic, or other type of data path. It is contemplated, however, that multi-bit data paths between the node and the host may also be used. In either instance, in the exemplary embodiment of the invention, as many as 15 stored packets may be concurrently transferred according to a time-division multiplex protocol from the transmit buffers 227 of the node to the associated host processor.

The receive queue provides two other signals, a high-water mark signal RQHWM and a low-water mark signal RQLWM. These signals indicate respectively, when the number of packets held by the queue is greater than a first predetermined number and less than a second predetermined number. The signal RQHWM is used by the control circuitry 214 to selectively inhibit other nodes and their hosts from sending packets to the node while the signal RQLWM is used to release the inhibition.

In addition to the receive queue, the modify register applies the received packet words to a pass though FIFO memory 228. This memory provides storage for packets being transferred around the ring. If the node is transmitting a packet while another packet—which is merely being passed through the node—is being received, the words of the received packet are stored in the FIFO 228 until the packet being transmitted has been sent. Then, the stored message is shifted out of the FIFO 228 and onto the ring. The operation of the FIFO 228 is described below in greater detail with reference to FIG. 7.

The node transmits packets provided by the host onto the network via a transmit queue 232. This queue holds as many as 15 packets to be transmitted to other nodes via the ring network. When packets are waiting in the transmit queue to be sent, the control circuitry 214 senses either a gap in the data being transferred through the node and/or, that the pass-through FIFO 228 has sufficient free space to hold a full packet. The control circuitry then conditions the output state machine 230 to transmit one of the packets which is waiting in the transmit queue. Alternatively, the control circuitry 214 may condition the state machine 230 to transmit a packet from the pass-through FIFO, or one of two short packets, generated by the lock packet generator 234 or start/stop packet generator 236. The operation of the output state machine 230 is described in more detail below with reference to FIG. 7.

Figure 7:
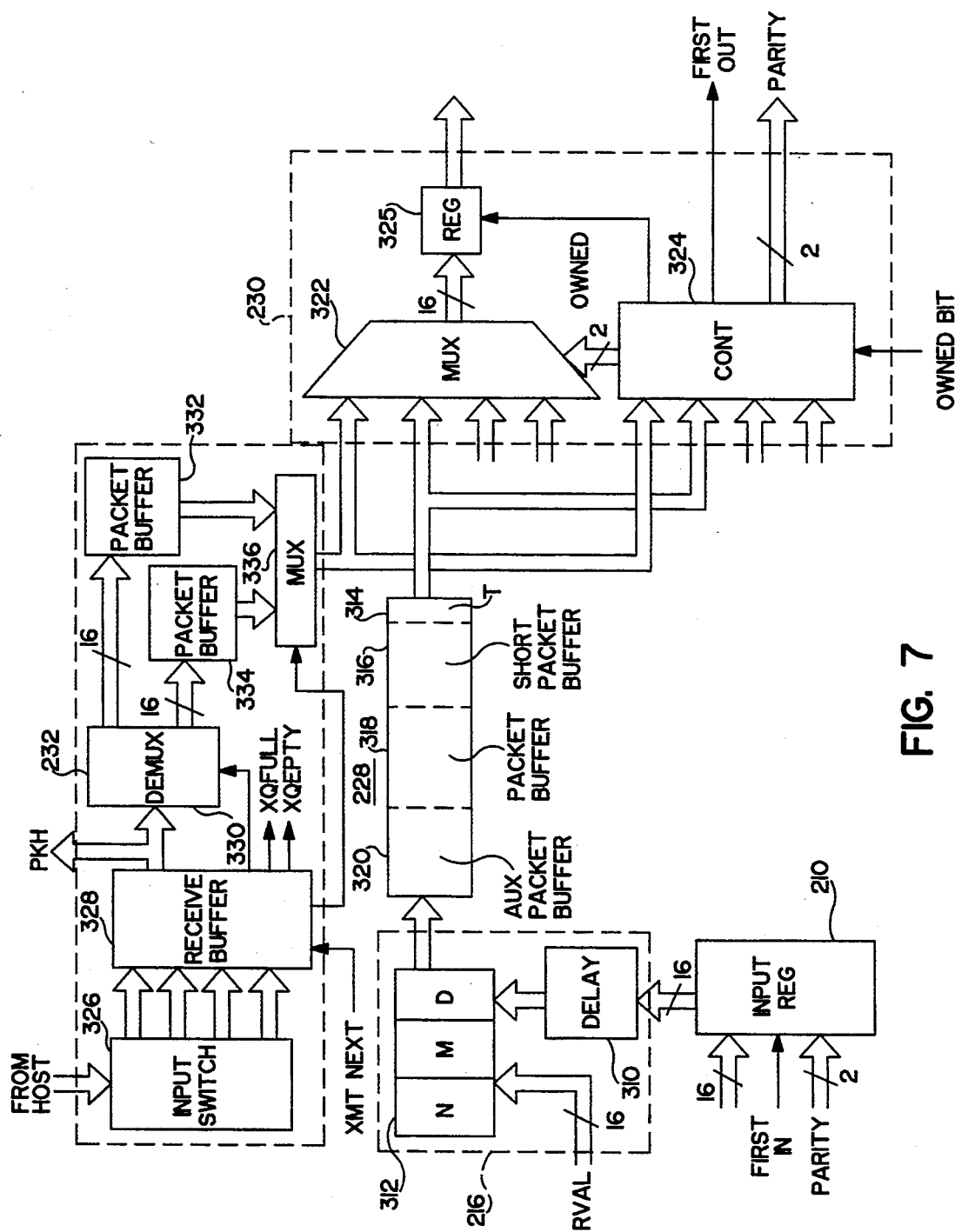
FIG. 7 is a block diagram of circuitry which shows details of portions of the node circuitry shown in FIG. 6.

FIG. 7 is a block diagram which illustrates a a portion of the node circuitry shown in FIG. 6 in greater detail. The 16 data bits loaded into the input register 210 are applied to a delay element 310 of the modify register 216. This delay element delays the word by a number of clock periods sufficient to allow the control circuitry 214 to determine if any bits in the word need to be changed. From the delay element 310, the word is loaded into a stage D of a three stage register 312.

The other two stages of the register, N and M are loaded by the control circuitry 214 via the 16 bit data path RVAL. Stage N holds the new value for selected bits of the word which are to be modified. Stage M holds a mask in which only those bits that are to be modified are set. In operation, the bits of stage N which correspond to the bits of stage M are selectively loaded into stage D to produce the modified word.

From the modify register 216, the packet words are applied to the pass-through FIFO 228. As shown in FIG. 7, the FIFO 228 includes four separate storage areas: a timing buffer 314, a short packet buffer 316, a full packet buffer 318 and an auxiliary packet buffer 320. As 16-bit words from the modify register 216 are applied to the FIFO 228, they are stored synchronous with a data input clock signal, DIN, provided by the control circuitry 214.

When the FIFO 228 is empty, each packet word is stored in the timing buffer 314 before it is transferred, synchronous with a data output clock signal DOUT, to the output state machine 230. If the output state machine 230 is busy as data is being shifted into the FIFO 228, the incoming data words are stored in the short packet buffer 316 and, if necessary in a portion of the full packet buffer 318. The combination of these two buffers allows the node to transmit a full packet and a short packet while packets are being received from the up-stream node. In normal operation, if a full packet is waiting in the pass-through FIFO 228, the control circuitry 214 inhibits the transmit queue 232 from sending any packets onto the network through the output state machine. This inhibition is removed when the pass-through FIFO 228 is empty or contains only a short packet.

The auxiliary packet buffer is used only when the network is so congested that the pass-through FIFO 228 does not become empty, and because of this, a message remains waiting in the transmit queue for a predefined interval. When these conditions have been met, the control circuitry 214 allows this area of the pass-through FIFO to be filled with an incoming packet while one of the packets in the transmit queue is sent over the network. This transmitted packet is "owned" by the node and remains active for the exclusive use of the node until either the network congestion eases or the number of packets waiting in the transmit queue falls below a preset threshold.

The host processor sends packets, which are to be transmitted to another host processor, to the input switch 326 of the node. Like the data path from the node to the host, the data path from the host interface processor to the node includes 15 logical channels, each of which may be sending one packet from the host to the node. Each of these packets may be associated with a respectively different process running on the host.

The input switch 326 converts the received signals into packets of 16-bit words and transfers these packets to a receive buffer 328. The receive buffer provides the oldest packet in the queue to the input port of a demultiplexer 330 and simultaneously provides the packet header information to the control circuitry 214 via the data path PKH. The demultiplexer 330 routes the packet from the receive buffer 328 to one of two packet buffers 332 and 334. The output ports of these buffers are coupled to the input ports of a multiplexer 336. Both the demultiplexer 330 and the multiplexer 336 are controlled by a signal provided by the receive buffer 328.

The packet buffers 332 and 334 implement a double buffering scheme in which a packet in one of the buffers, e.g. 332, may be sent onto the network through the output state machine 230 while another packet is being loaded, from the receive buffer 328, into the other buffer e.g. 334. Thus, the control signal for the demultiplexer 330 conditions it to direct packet words into one of the buffers 332 and 334 while the control signal for the multiplexer 336 conditions it to extract words from the other buffer.

Packet words which are to be sent onto the network are applied to a multiplexer 322 and to a controller 324. The controller 324 selects which of the packets from four competing sources is to be sent onto the network. It also calculates the parity for each packet word and generates a signal FIRST OUT which becomes the FIRST IN signal for the next node. In addition, the control circuitry 324 causes the owned bit, O, of the packet to be set if, as described above, an owned packet is needed by the node. The four packet sources are the transmit queue 232, the pass-through FIFO 228, the lock packet generator 234 and the start/stop packet generator 236. All of these sources are shown in FIG. 6.

The following is a description of the operation of the network in terms of flow-chart diagrams. This description refers to the hardware elements of the system, described above. While the flow-chart diagrams used to explain these functions are commonly used to describe control software for a programmed processor, in this embodiment of the invention, they describe functions which are implemented as various finite state machines. Thus, these flow-chart diagrams describe control flow implemented in the control circuitry 214, shown in FIG. 6. It is well known that a software programmed general purpose computer may be replaced by an equivalent hardwired finite-state machine. It is contemplated, therefore, that the control circuitry 214 may be replaced by one or more equivalent programmed computer processors.

These flow-chart diagrams are not in their simplest form. They are, however, in a form which produces a relatively compact hardware implementation of the state machines. A key factor in producing compact state machines is the sharing of portions of the machines. This manifests itself in the flow-chart diagrams as similar or identical sequences of steps in the diagrams which describe the operation of different state machines.

Figure 9A:
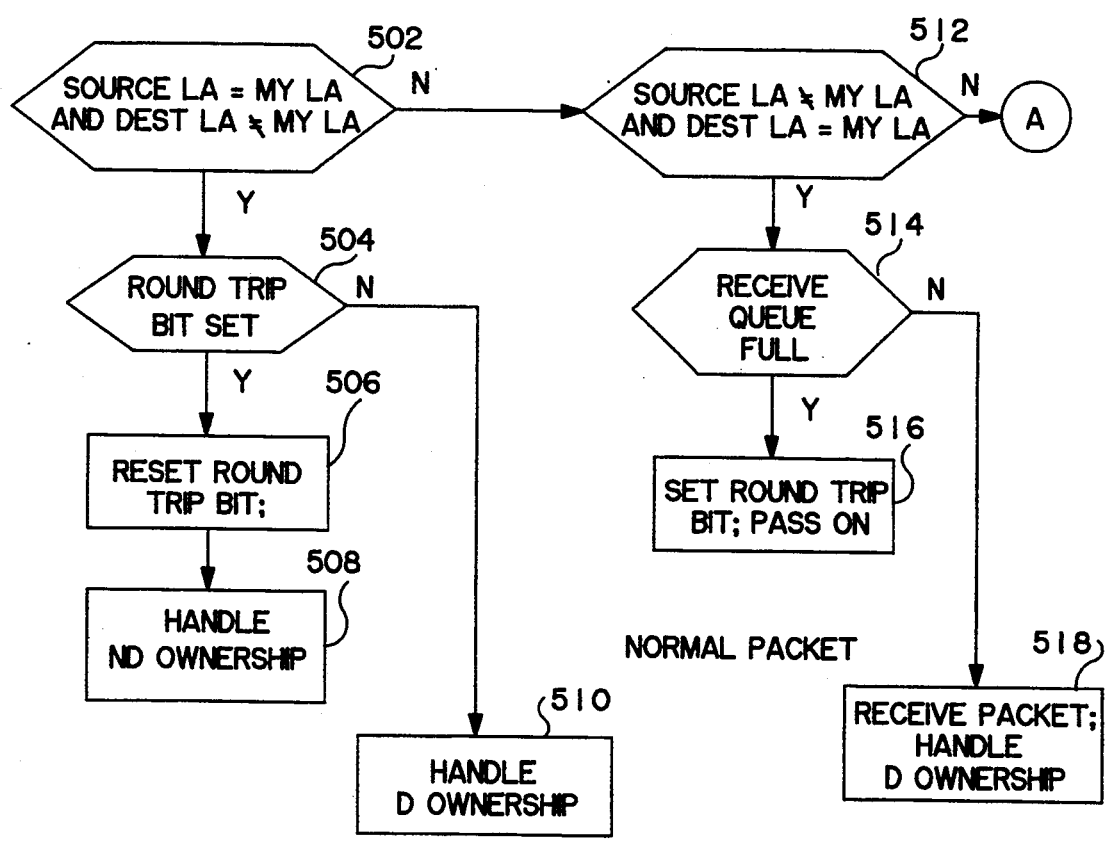
FIGS. 9a and 9b are flow-chart diagrams which illustrate the operation of the network shown in FIGS. 2-7 when a data packet is received.
Figure 9B:
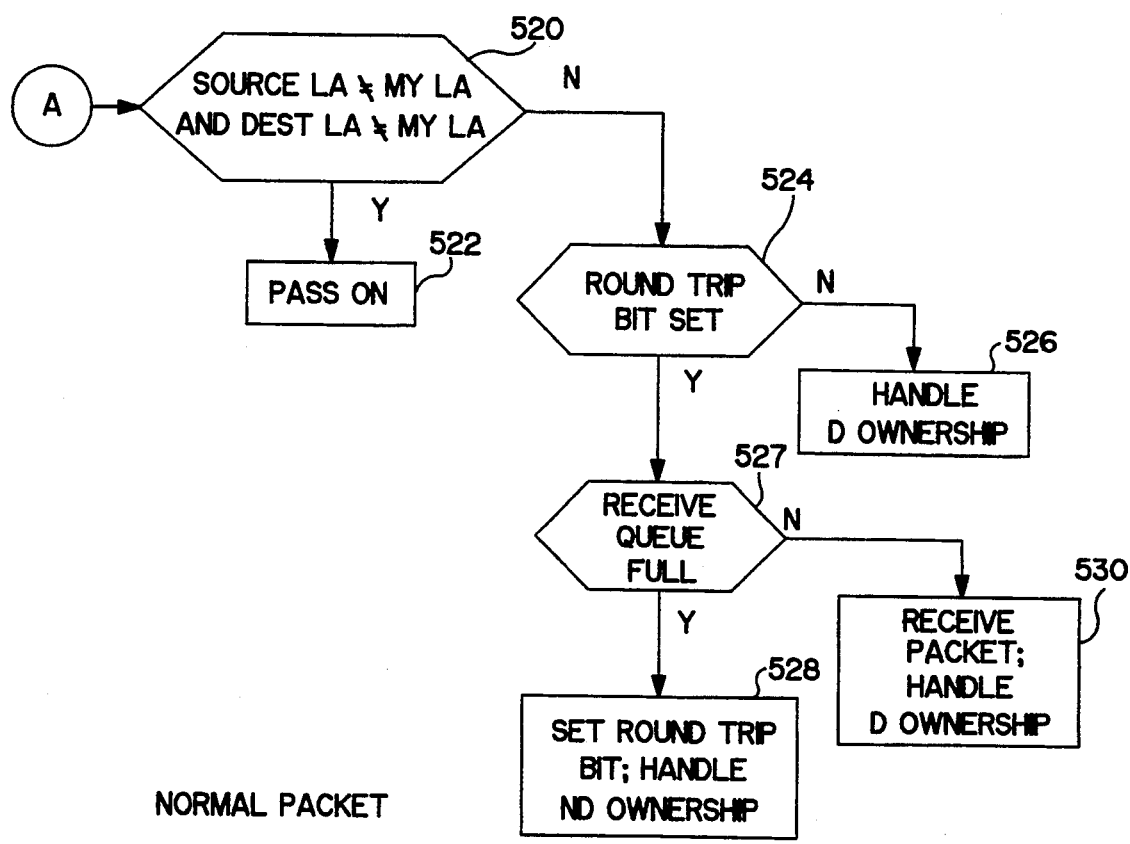

A processing step which precedes any of these flow-chart diagrams is the receipt and classification of the packet. Packets are classified by the SOCKET ID, DEST LA, SOURCE LA and TYPE fields appearing in the first three words. The flow-charts below are segregated based on the TYPE field of the packet. FIGS. 9a and 9b concern packets having a type of "normal".

FIGS. 9a and 9b concern the steps taken by a node when a packet having a TYPE field of "normal" is received. Packets of this type carry data from a first process, coupled to one node, to a second process, coupled to a different node. In an efficient network which is not used primarily for multicasting, this should be the most common type of packet.

The first step in FIG. 9a, step 502, determines if the source loop address (SOURCE LA) field of the packet designates this node and if the destination loop address (DEST LA) does not designate this node. If both of these conditions are met, step 504 is executed which determines if the round-trip bit (R) is set in the third word of the packet.

If the bit R is set, then this packet was previously sent by this node to the designated destination node. That node, however, was temporarily unable to receive the packet, perhaps because its receive queue was full. To delay receiving the packet, it set the round-trip bit and passed the packet back on to the loop. This is the packet that is now being received by the source node. In this instance, the source node, at step 506, resets the R bit and, at step 508, places the packet back on the loop to once again be received by the destination node. The step 508 invokes a state machine which implements a procedure, HANDLE ND OWNERSHIP. In addition to passing the packet back onto the loop, this state machine causes the output state machine 230 to mark the packet as owned by the source node if the packet was previously owned and an owned packet is still required.

If, however, at step 504, the round-trip bit (R) is not set, step 510 is executed which invokes the state machine HANDLE D OWNERSHIP. This state machine deletes the packet unless it is an owned packet which is still needed.

A node may require an owned packet when so many packets are being transferred around the network, that the pass-through FIFO 228 of the node never contains at least one full packet for a predetermined time interval. As set forth above, in this instance packets in the transmit queue 232 of the node cannot be sent because packets from the pass-through FIFO 228 have a higher priority.

When, due to network congestion, the node determines that an owned packet is needed, it sets an internal logical value OWNERSHIP in the memory 218 and activates the signal DIN to store the next incoming packet into the auxiliary packet buffer area 320. While these data words are being stored, a packet from the transmit queue is marked as being owned, by setting the bit O in the third word of the packet, and sent over the network by the output state machine 230. The source loop address (SOURCE LA) field of this packet contains an identifier (MY LA) which designates this node as the source of the packet.

When this packet returns to the node after traveling around the loop, the control circuitry detects that this node was the source of the packet and, after handling the data in the packet, invokes HANDLE D OWNERSHIP or HANDLE ND OWNERSHIP to handle the packet. While OWNERSHIP is set in the node, this packet continually circulates around the loop for the exclusive use of its identified node.

Returning to FIG. 9a, if one of the conditions at step 502 is not met, step 512 is executed. This step determines if the SOURCE LA field does not designate this node while the DEST LA field does. If so, then this packet was sent by another node to be received by this node. Step 514 checks the state of the signal RQFULL which indicates if the data can be stored in the receive queue. If the receive queue cannot accept a packet, step 516 is executed which sets the round-trip bit (R) in the packet and sends the packet around the loop again. This operation delays the receipt of the packet by one trip around the loop in hope that space for at least one packet will be available in the receive queue when the packet returns.

If, at step 514, the receive queue for the node is not full, step 518 is executed. This step conditions the receive queue 226 to accept the packet and handle the packet by invoking the state machine HANDLE D OWNERSHIP.

If the conditions at step 512 are not met, the process for handling a normal packet continues through the off-page connector A to FIG. 9b. In FIG. 9b, if neither the source loop address (SOURCE LA) nor the destination loop address (DEST LA) of the received packet indicate this node, then step 522 is executed which passes the packet without modification through the pass-through FIFO 228 and the output state machine 230 and onto the network.

If the conditions at step 520 are not met then, both the SOURCE LA and the DEST LA of the received packet indicate this node. In this instance, step 524 determines if the round-trip bit (R) is set. If not, step 526 deletes this packet unless it is an owned packet which is still needed.

If, at step 524, the round-trip bit (R) is set, then this packet was previously processed but there was no room in the receive queue. Step 527 determines if there is now room for the packet in the receive queue 226. If so, step 530 is executed which transfers the packet to the receive queue and invokes the state machine HANDLE D OWNERSHIP.

Otherwise, step 528 conditions the modify register 216 to set the round-trip bit, R, in the third word of the packet and transfers the packet back on to the loop by invoking the state machine HANDLE ND OWNERSHIP.

Figure 10:
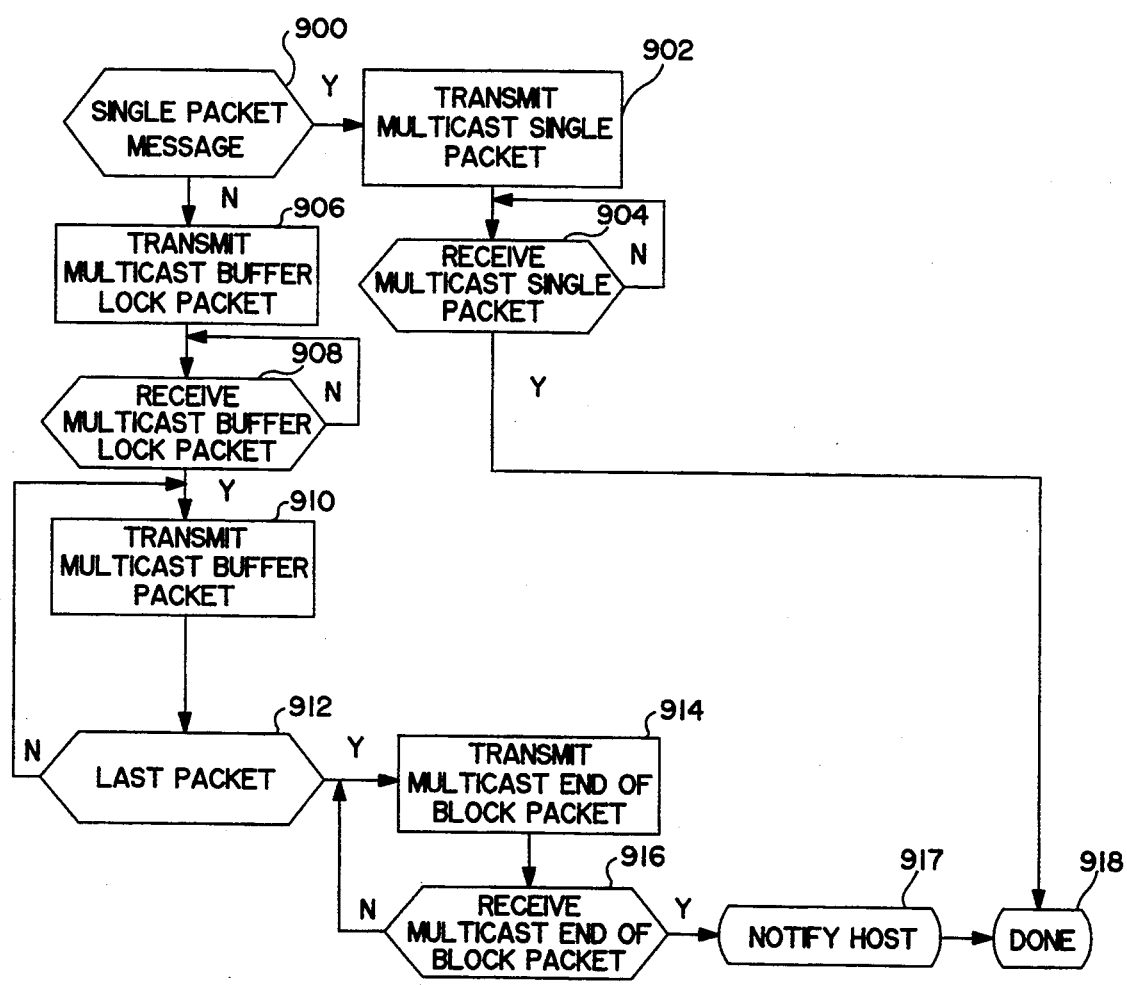
FIG. 10 is a flow-chart diagram which illustrates the operation of a reliable multicast system that uses the network shown in FIGS. 2-7.

FIG. 10 concerns a multicasting system which uses the embodiment of the invention described above. This system may be used to transmit video data or other types of data to several other hosts. FIG. 10 is a flow-chart which illustrates the normal control flow involved in transmitting a multicast message using the exemplary multicast system. The transmission process begins at step 900 when the host requests that a multicast message (e.g. referring to FIG. 2, an image of one of the conferees A through I) be sent. If, at step 900, the entire message can be transmitted in a single packet, the node, at step 902, transmits the MULTICAST SINGLE packet request from the host without using the exemplary buffer lock scheme described below. In this instance, at step 904, when the originating node receives its own MULTICAST SINGLE packet, the multicast message transmission has been completed.

When the message, at step 900, cannot be contained in a single packet, the host interface processor INT breaks the message to fit into one or more MULTICAST BUFFER packets and one MULTICAST END OF BLOCK packet. In this case, the processor INT first transmits, at step 906, a MULTICAST BUFFER LOCK packet to cause the other nodes in the multicast group to pre-allocate a buffer to receive the message. This is a short packet which is sent by the processor INT onto the loop via the transmit queue 232 and output state machine 230 of the node. In response to this packet, the other nodes in the multicast group (i.e. those having the SOCKET ID of the multicast buffer socket in their Content Addressable Memories CAM's 222) allocate a buffer to receive the message and then pass the MULTICAST BUFFER LOCK packet back onto the ring.

Since the SOCKET ID field is used to define the multicast group, the receiving host computer knows, by a previously established configuration, to allocate the buffer either in the host memory 374 or one of the frame memories 372 or 364, as shown in FIGS. 3a and 3b.

Once the MULTICAST BUFFER LOCK packet returns on the ring to the originating node, at step 908, all receiving multicast nodes in the group have a buffer allocated for the message.

It is contemplated that the size of the buffer may either be established by convention among the members of the group or it may be encoded in the parameter field of the packet. The node begins sending the MULTICAST BUFFER packet, at step 910. The MULTICAST BUFFER packet is used to pass the message until the last packet is ready to be sent at step 912. Here, at step 914, the MULTICAST END OF BLOCK packet is sent by the node to indicate the end of the multicast message. When the MULTICAST END OF BLOCK packet is returned to the node unmodified, at step 916, all multicast nodes in the group have received the message. At step 917, the host is then notified that the message has been received.

For video transmission, the multicast buffer may be a pair of image frame or field buffers which are used in a ping-pong manner such that one buffer is available for receiving image data while data is being displayed from the other buffer.

For each of the multicast packet types, there is a corresponding REQUEST type (e.g. MULTICAST SINGLE PACKET and REQUEST MULTICAST SINGLE PACKET). A packet is converted into its corresponding REQUEST type if one member of the multicast group cannot receive the packet, and then reconverted to its non-REQUEST type when the group member can receive the packet.

FIG. 3a is a block diagram of one exemplary host and interface configuration. The interface via a communications link 398 receives data packets from the transmit queue and switch 232 and sends data packets to the transmit buffers 227 in a node as shown in FIG. 6.

The data link controller 396 in the interface receives data packets from the transmit buffers 227 and transmits data packets to the transmit queue and switch 232 in its associated node. The interface between the data link controller and the node is a non-reliable communications link which uses a protocol to indicate whether a transmission was successful. The interface includes a twisted pair line between the data link controller 396 and transmit queue and switch 232 and the transmit buffers 227. The twisted pair line is divided into fifteen time division multiplexed channels.

In addition, the data link controller 396 receives data packets from the packet handler 392 and transmits data packets to the packet handler 392. After successful receipt of a data packet from the transmit queue and switch 232, the data link controller 396 transmits the data packet to the packet handler 392 over a communications link. The data link controller 396 has the ability to buffer data packets so the packets may be retransmitted to the transmit queue and switch 232 if necessary.

The packet handler 392 performs the task of packeting and depacketing data packets. The packet handler 392 creates data packets from data values provided by the hostbus controller 390, and header information passed from the micro engine 394. The header information includes the socket identifier, the data type and the destination address for data in the packet. The packet handler 392 stores the header information received from the micro engine 394 in a table memory area. After the packet handler forms a data packet from the data values and control information, the packet is transferred to the data link controller 396 on the communications link. The packet handler also has the ability to buffer data values, control information, and data packets if necessary due to error conditions or activity in the data link controller 396 or hostbus controller 390.

In addition, the packet handler 392 depackets packets received from the data link controller 396. The packet handler transmits the data values contained in the data packet to the hostbus controller 390 and control information contained in the data packet to the micro engine 394 and hostbus controller 390. The packet handler 392 buffers the data values and control information until the hostbus controller 390 is able to receive the data values.

The micro engine 394 receives control information from the hostbus controller 390, packet handler 392, and the host processor 380. The micro engine 394 uses the information to control part of the operations of the packet handler 392 and hostbus controller 390. The micro engine 394 also helps coordinate the data transfer between the hostbus controller 390, packet handler 392, and data link controller 396 by managing part of the buffering and timing control of the packet handler 392 and hostbus controller 390.

The micro engine 394 receives control information from the host processor 380 via a communications line 382. The control information includes the data type and destination address of the data values being transmitted via the databus 350 to the hostbus controller 390.

The hostbus controller is also coupled to the host processor 380 via a dedicated connection 383. This connection may be used to determine from which of the memories 372, 374 and 364 the hostbus controller 390 is to receive data.

The hostbus controller 390 sends data values to the packet handler 392, receives data values from the packet handler 392, sends data values to the host, and receives data values from the host via the databus 350. The hostbus controller 390 receives data values and control information contained in packets passed to the node from the packet handler 392 over a communications link. The hostbus controller 390 also sends data values and control information to the packet handler 392 to be formatted into packets and transmitted on the network 100 over the communications link 398. The hostbus controller 390 also has the ability to buffer data values and control information as necessary due to transmission errors or activity in the packet handler 392, micro engine 394, camera interface/memory 372, host memory 374, hardware interface 362 to the frame buffer memory area 364, or databus 350.

The hostbus controller 390, via the databus 350, also sends data values to and receives data values from the host memory 374 and receives data values from the camera interface/memory 372 and sends data values to the frame buffer 364 through a hardware interface 362. The databus 350 provides a communication link between the hostbus controller 390, the camera interface/memory 372, host memory 374, and hardware interface 362 to the frame buffer memory area 364.

When the hostbus controller 390 places data values on the databus 350 it may select which device on the databus 350 is to receive the data values based on information contained in the packet. The hostbus controller 390 selects which device is to receive the data values based on the control information obtained from the packet by the packet handler 392. In this exemplary embodiment of the invention, the control information includes the socket identifier for the packet. If this identifier has been previously identified as being a session which receives video data, the hostbus controller 390 selects the hardware interface 362 to the frame buffer memory 364 as the device on the databus 350 to receive the data values. Otherwise, the hostbus controller 390 selects the host memory (data memory) 374 as the device to receive the data values.

The hostbus controller 390 also receives data values and control information from the databus 350. The hostbus controller 390 receives video data from the camera/interface memory 372 and other data from the host memory 374.

The camera 370 captures light reflected from a scene and generates video signals that are received by the camera interface/memory 372. The video signals produced by the camera 370 are data sample values from an orthogonal sampling structure which is provided by the camera 370 in raster scan order.

The camera interface/memory 372 processes the video signals generated by the camera 370 to produce video digital data values in raster scan order. The processing may include, for example, compression techniques to reduce the number of data values required to represent the video signal generated by the camera 370. The processing may also include low pass filtering of the video signal and horizontal and vertical subsampling of the filtered video signal to reduce the image size and consequently the number of video data values necessary to represent the smaller image size.

Exemplary video data may have a separate data value for three red (R), green (G), and (B) signals at each sample point in the orthogonal sampling structure. The video data is placed in a memory area within the camera interface/memory 372. The hostbus controller 390 is synchronized with the camera 370 to request, via the databus 350, data from an existing frame or field buffer area of the two ping-pong buffers in the camera interface/memory 372.

The hostbus controller 390 may be synchronized to the camera 370 in several ways. The camera may write a predefined value into a particular memory location when a frame or field is ready to be transferred. In this instance, the hostbus controller 390 would desirably monitor that memory location to determine when it may extract data. Alternatively, the clock signal used by the camera to write data into the memory 372 may be supplied to the hostbus controller which then extracts data at fixed times, as determined by the clock signal. In a third alternative, the hostbus controller 390 may be interrupted either by the host processor 380 or by the camera 370 whenever a new frame or field is available.

The hardware interface 362 to the frame buffer memory area 364 receives video data values from the hostbus controller 390 via the databus 350. The hardware interface 362 to the frame buffer memory area 364 performs any formatting of the data that may be needed prior to display and transmits the formatted video data to the frame buffer 364. The formatting may include, for example, horizontal and vertical subsampling and low pass filtering so that the image area of the video data is substantially similar to the image area on the display for the video data such as segment A shown in FIG. 2.

The frame buffer 364 stores the video data values that represent the image to be displayed in the segments of the display device 360. The frame buffer 364 receives formatted video data values from the hardware interface 362 and transmits video data values to the display driver 366 in a raster scan order.

The display driver 366 receives data values from the frame buffer in a raster scan order and transmits them to the display device 360. The display device 360 displays the data values transmitted from the display driver 366.

The host processor 380 communicates with the camera interface/memory 372, host memory 374, hardware interface 362 to the frame buffer 364 memory area, display driver 366, and the micro engine 394. The host processor provides the control information for data values transferred from the camera interface/memory 372 and the host memory 374 to the hostbus controller via the databus 350. The control information includes the socket identifier and destination address, for the data values being transmitted to the hostbus controller 390. This control information is transmitted to the micro engine 394 via the communications link 382. The host processor 380 also controls the receipt of data values to the host memory from the hostbus controller 390 via the databus 350.

In general, the host processor 380 initiates and controls the timing of data transfer between the various units in the host with each other and the flow of data from and to the databus 350 with devices in the host. In some instances, however, this control function may simply initiate an ongoing operation to transfer data to and/or from one of the frame memories 372 and 364 as it becomes available.

FIG. 3b is a block diagram of another exemplary host and interface configuration similar to the configuration shown in FIG. 3a. In this configuration, the hostbus controller 390 transmits video data values directly into a frame buffer 363. Otherwise this configuration is substantially analogous to the configuration shown in FIG. 3a.

The frame buffer memory area 363, in this exemplary embodiment, may contain several frame buffer or field buffer storage areas so that multiple frame size images may be stored. In the exemplary embodiment, part of the control information contained in a packet may include the frame or field buffer area in the memory 363 into which the video data contained in the packet is to be stored.

The image processor 361 receives video data values from the frame buffer 363 and transmits video data values to the display driver 366 in a raster scan order. The image processor 361 receives video data values from the various memory areas in the frame buffer 363. The image processor 361 performs any formatting of the data that may be needed prior to display and transmits the formatted video data to the display driver 366. The formatting may include, for example, horizontal and vertical subsampling and low pass filtering so that the image area of the video data is substantially similar to the image area on the display for the video data such as segment A shown in FIG. 2.

FIG. 4 is a block diagram of yet another exemplary host and interface configuration. In this configuration packets sent to and received from a node in the network 100 shown in FIG. 2 and 5 are passed through a logical switch 496. The logical switch 496 directs incoming packets to the demultiplexer 410 and outgoing packets from the multiplexer 430 to a node.

The multiplexer 430 serves to packet data values stored in buffers 432, 434, and 436. The demultiplexer 410 serves to depacket incoming packets and to place the data values contained in the incoming packets in the buffers 412, 414, and 416.

A direct memory access (DMA) device 490 reads data values from the depacketed packets held in the buffers 412, 414 and 416 and transfers the data values to the memory 474 in the host. The DMA device 490 also places data values received from the memory 474 in the host into the buffers 432, 434, and 436 to be formed into packets.

The microcontroller 494 controls part of the operation of the DMA 490, buffers 412 to 436, demultiplexer 410, multiplexer 430, and the logical switch 496. The microcontroller receives control information from and provides control information to the host processor 480.

The host 480 in this configuration has a single memory device 474 which includes a dedicated frame buffer area 464. The DMA 490 directs the data values transferred from the buffers 412, 414, and 416 to the appropriate memory area in the memory 474 as indicated, for example, by the socket identifier that is assigned to the packet.

The display driver 466 reads data values from the frame buffer area 464 in the memory 474 and directs the data values to the display device 460. The host processor 480 controls the operation of the memory 474, receives control information from the microcontroller 494 and sends control information to the microcontroller 494. The host processor also receives video data information from the camera 470 and from the keyboard 450 and directs the data to be stored in the appropriate area in the memory 474.

While the invention has been described in terms of exemplary embodiments, it is contemplated that it may be practiced as outlined above within the spirit and scope of the appended claims.

What is claimed:

1. A network interface suitable for conveying data from a system that includes a relatively low-bandwidth data source and a relatively high-bandwidth data source onto a network, the network interface comprising:

data retrieval means, responsive to a control value for selectively retrieving data from one of the low-bandwidth data source and the high-bandwidth data source;

means for providing the data retrieval means with an address value to be used to retrieve the data and said control value to define from which source the data is to be retrieved; and means, coupled to the data retrieval means for combining the retrieved data with the address value and the control value and for transmitting the combined values to the network.

2. A network interface according to claim 1, wherein the source of low-bandwidth data is a computer memory, coupled to a host computer, and the source of high-bandwidth data is a video memory.

3. A network interface according to claim 2, wherein the system further includes a video camera for storing video data representing successive video images into the video memory, and for signalling the retrieval means when video data is available in the video memory to be transferred onto the network.

4. A network interface according to claim 3, wherein the video memory includes first and second buffer areas and the camera stores video data into the first buffer area while the retrieval means retrieves data from the second buffer area.

5. A network interface according to claim 1, wherein the network includes host processor means for multicasting data to multiple receivers coupled to the network using a socket identifier to identify data which is to be multicasted and wherein the socket identifier is applied by the host processor means to the retrieval means as the control value.

6. A network interface suitable for conveying data from a data communications network to a system that includes host computer coupled to a relatively low-bandwidth data memory and to a relatively high-bandwidth data memory, the network interface comprising:

receiving means for receiving data values from the network, said data values including a socket identifier which identifies a process running on the host computer which will use the data and an address value to be used to store the data; and data storage means, responsive to the socket identifier for selectively storing the received data into one of the low-bandwidth data memory and the high-bandwidth data memory.

7. A network interface according to claim 6, wherein the high-bandwidth data is video data and the high-bandwidth data memory is a video memory which is directly coupled to a display device that periodically displays the contents of the video memory to display a moving image.

8. A network interface according to claim 7, wherein the video memory includes first and second buffer areas and the display device alternates between displaying video data from the first and second buffer areas and the data storage means alternates between storing the video data into the second and first buffer areas, respectively.

9. A network interface according to claim 8, wherein the network includes means for multicasting data to multiple host computers coupled to the network using the socket identifier to identify data which is to be multicasted.

10. A network interface system suitable for use in coupling a host processor to a data communications network which conveys relatively high-bandwidth data and relatively low-bandwidth data, where the host processor has a primary data memory area used to store the low-bandwidth data values and a distinct secondary data memory area used to store the high-bandwidth data values and where the data values transferred on the network have information, associated with the data values, which directs the data values to one of the primary and secondary data memory areas, the network interface system comprising:

means for receiving the data values from the network;

memory means for holding the data values; and controller means, responsive to the information associated with the data values, for transferring the data values from the memory means directly to the secondary data memory area if the information indicates that the data values are high-bandwidth data values; and for transferring the data values from the memory means to the primary data memory area if the information indicates that the data values are low-bandwidth data values.

11. A network interface system suitable for use in coupling a host processor to a packet switched data communications network which conveys packets containing video data where the host processor has a camera capable of generating video signals, a data memory area used to store data values and a camera memory area used to store video data, and the packets on the network have a destination address and a socket identifier where the socket identifier indicates whether data for the packets is to be taken directly from the camera memory area or from the data memory area, the network interface system comprising:

means for processing the video signals generated by the camera to produce video data and for placing the video data in the camera memory area;

means for transferring the destination address and data type for the video data in the camera memory area from said host processor to said packet generation means;

packet generation means for forming packets containing the video data transferred from said camera memory area, and the destination address and the data type transferred from said host processor;

means for signalling the packet generation means when a video data is available to be transferred via the network, wherein the packet generation means is responsive to said signaling means for transferring the video data from said camera memory area directly to said packet generation means; and packet forwarding means for placing said packets formed by said packet generation means onto the network.

* * * * *